United States Patent [19]
Kitajima et al.

[11] Patent Number: 5,552,886
[45] Date of Patent: Sep. 3, 1996

[54] LASER BEAM TRANSMITTING APPARATUS

[75] Inventors: Eiichi Kitajima; Keijun Kishi, both of Yokohama, Japan

[73] Assignee: Nikon Corporation, Tokyo, Japan

[21] Appl. No.: 394,815

[22] Filed: Feb. 27, 1995

[30] Foreign Application Priority Data

Mar. 1, 1994 [JP] Japan .................................. 6-054853
Mar. 11, 1994 [JP] Japan .................................. 6-067671

[51] Int. Cl.$^6$ ........................... G01C 15/00; G01C 15/10
[52] U.S. Cl. ........................... 356/250; 356/149; 33/291; 33/DIG. 21
[58] Field of Search ............................ 356/138, 149, 356/250, 399; 33/283, 291, 227, DIG. 21

[56] References Cited

U.S. PATENT DOCUMENTS 4,221,483  9/1980  Rando ..................... 356/250
5,144,487  9/1992  Hersey .................... 359/629

FOREIGN PATENT DOCUMENTS 0297601   1/1989   European Pat. Off. .
2200474   8/1988   United Kingdom .
WO90/13002 11/1990  WIPO .

*Primary Examiner*—F. L. Evans
*Attorney, Agent, or Firm*—Shapiro and Shapiro

[57] ABSTRACT

This invention provides a laser beam transmitting apparatus which can make the levelling work unnecessary to thereby mitigate the burden of an operator and improve work efficiency. The apparatus is provided with a base, a beam transmitter for supplying a beam of light, a housing, for holding the beam transmitter, and a levelling mechanism provided between the housing and the base, the housing being oscillatably supported on the base, and the center of oscillatory movement thereof lying above the centroid of the housing. Thus, there is achieved double bearing combined with a precise levelling mechanism, provided between the beam transmitter and the housing.

13 Claims, 7 Drawing Sheets

LASER BEAM TRANSMITTING APPARATUS

BACKGROUND OF THE INVENTION

1. Field of the Invention

This invention relates to a laser beam transmitting apparatus for use in construction and civil engineering industries, and particularly to a laser beam transmitting apparatus for use for levelling using a laser beam and marking work along a horizontal plane or a vertical plane.

2. Related Background Art

There is known a laser beam level instrument as disclosed, for example, in U.S. Pat. No. 4,221,483. This laser beam level instrument converts light from a light source such as an He-Ne gas laser or a laser diode into a substantially collimated beam by an optical system having a collimator lens, and causes the beam to emerge in a horizontal direction by way of a rotatable mirror, thereby supplying a beam of light swept on a horizontal plane.

This apparatus according to the prior art will hereinafter be described with reference to FIG. 1 of the accompanying drawings.

A cylindrical inner housing 103 holding a collimator lens 105 is suspended from a beam transmitting unit 101 by means of three wires 102. The inner housing 103 is contained in a cylindrical fixed housing 104 fixed to the beam transmitting unit 101, and the outer peripheral surface of the inner housing 103 is spaced apart by a minute distance d from the inner peripheral surface of the fixed housing 104 and has the function of automatically correcting inclination within this range.

A light source 111 emitting a beam of light L is disposed substantially at the focal position of the collimator lens 105. A cylindrical rotatable member 114 is disposed below the collimator lens 105, and the rotatable member 114 is rotatably mounted on the beam transmitting unit 101 through a bearing 116. A pair of mirrors 115 for reflecting the beam of light L from the collimator lens 105 at a right angle are fixed to the interior of the rotatable member 114. The rotatable member 114 is rotated by a motor 110 through a transmission belt 118. The beam of light L reflected by the pair of mirrors 115 is caused to emerge outwardly through windows 114a and 101a and is swept in the direction of 360° in a horizontal plane.

The beam transmitting unit 101 is placed on a levelling unit 130. The levelling unit 130 comprises an upper plate 131 fixed to the beam transmitting unit 101, and a lower plate 132 mounted on the upper plate 131 through three levelling screws 133. The lower plate 132 is connected to a tripod. A bubble tube 134 is fixed to the upper plate 131.

When installing the apparatus through the tripod, the operator turns the levelling screws 133 while watching the bubble tube 134 and effects rough levelling work. By this work, the operator can correct inclination up to the order of ±10' (minutes). When the manual levelling work by the operator is done, precise level accuracy within ±10" (seconds) is achieved by the above-described automatic inclination correction work of the inner housing 103.

However, the range within which the precise levelling by the automatic inclination correction is possible is as small as several tens of minutes and therefore, the levelling work of turning the levelling screws 133 while watching the positions of bubbles in the bubble tube 134 has required skill and has been practically cumbersome to the operator, and has taken much time until levelling is done up to an angle of several tens of minutes. Accordingly, when the laser beam transmitting apparatus is frequently moved for use, the burden of the operator has become greater, thus resulting in the aggravation of work efficiency.

SUMMARY OF THE INVENTION

It is a primary object of the present invention to provide a laser beam transmitting apparatus which can make the levelling work unnecessary to thereby mitigate the burden of an operator and improve work efficiency.

The laser beam transmitting apparatus of the present invention is provided with a base, a beam transmitter for supplying a beam of light, a housing for holding the beam transmitter, and a levelling mechanism provided between the housing and the base, the housing being oscillatably supported on the base and the center of oscillatory movement thereof being positioned above the centroid of the housing.

The laser beam transmitting apparatus of the present invention is provided with a precise levelling mechanism between the beam transmitter and the housing, whereby it can accomplish double levelling combined with the rough levelling function by the levelling mechanism between the housing and the base.

In a rough levelling mechanism according to an embodiment of the present invention, a concave spherical inner wall surface for receiving the housing is provided on the base, and a bearing device is provided between the housing and the spherical inner wall surface. The centroid of the housing is positioned below the center of curvature of the spherical inner wall surface. A vibration attenuator is provided between the housing and the base. Gimbal structure may be used as the rough levelling mechanism.

Further, according to an embodiment of the present invention, provision is made of an outer case having an upper surface portion, an outer housing oscillatably suspended from the upper surface portion of the outer case, and an inner housing holding the beam transmitter and oscillatably suspended from the outer housing.

DESCRIPTION OF THE PREFERRED EMBODIMENTS

Figure 1:
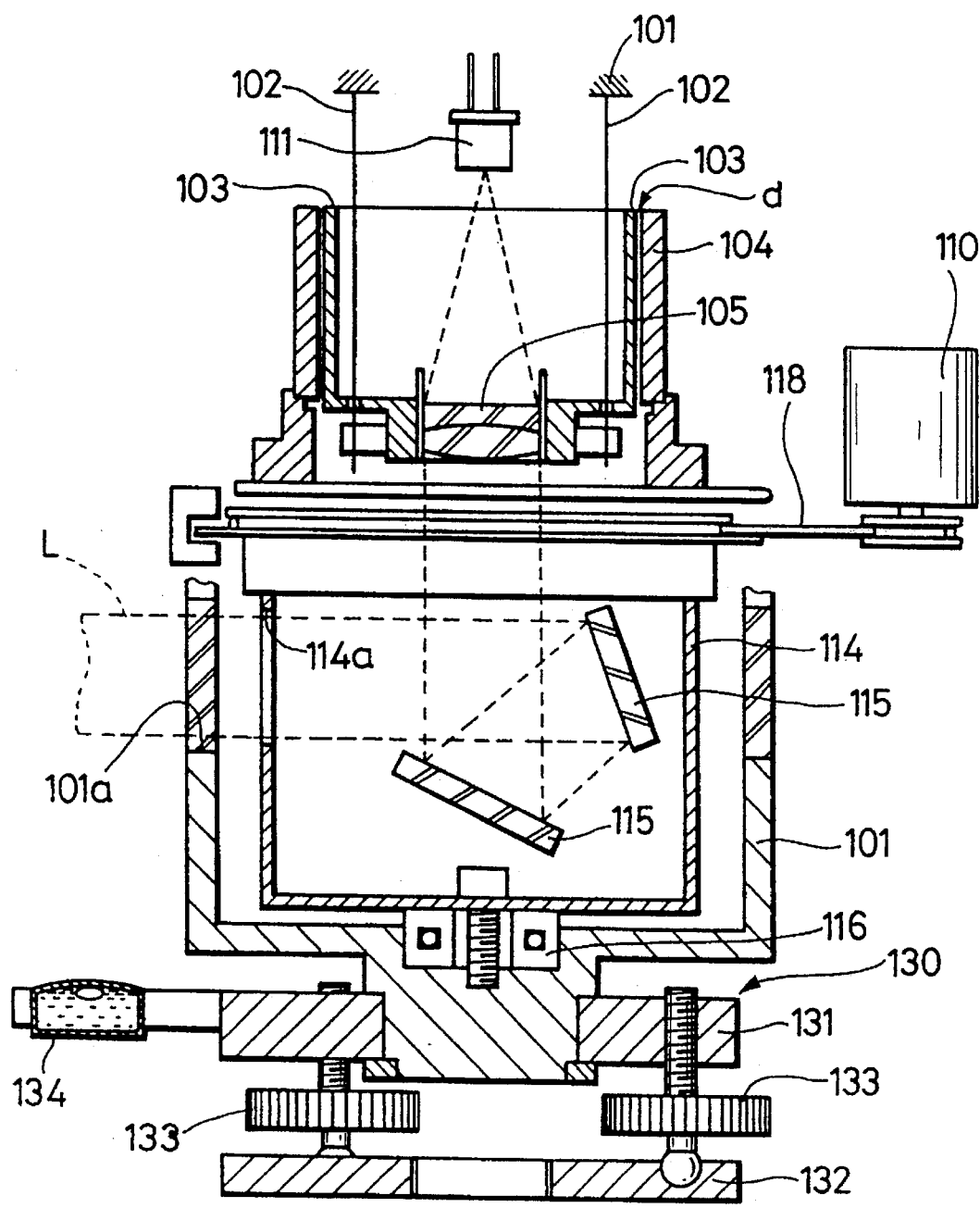
FIG. 1 is a vertical cross-sectional view of a laser beam transmitting apparatus according to the prior art.
Figure 2:
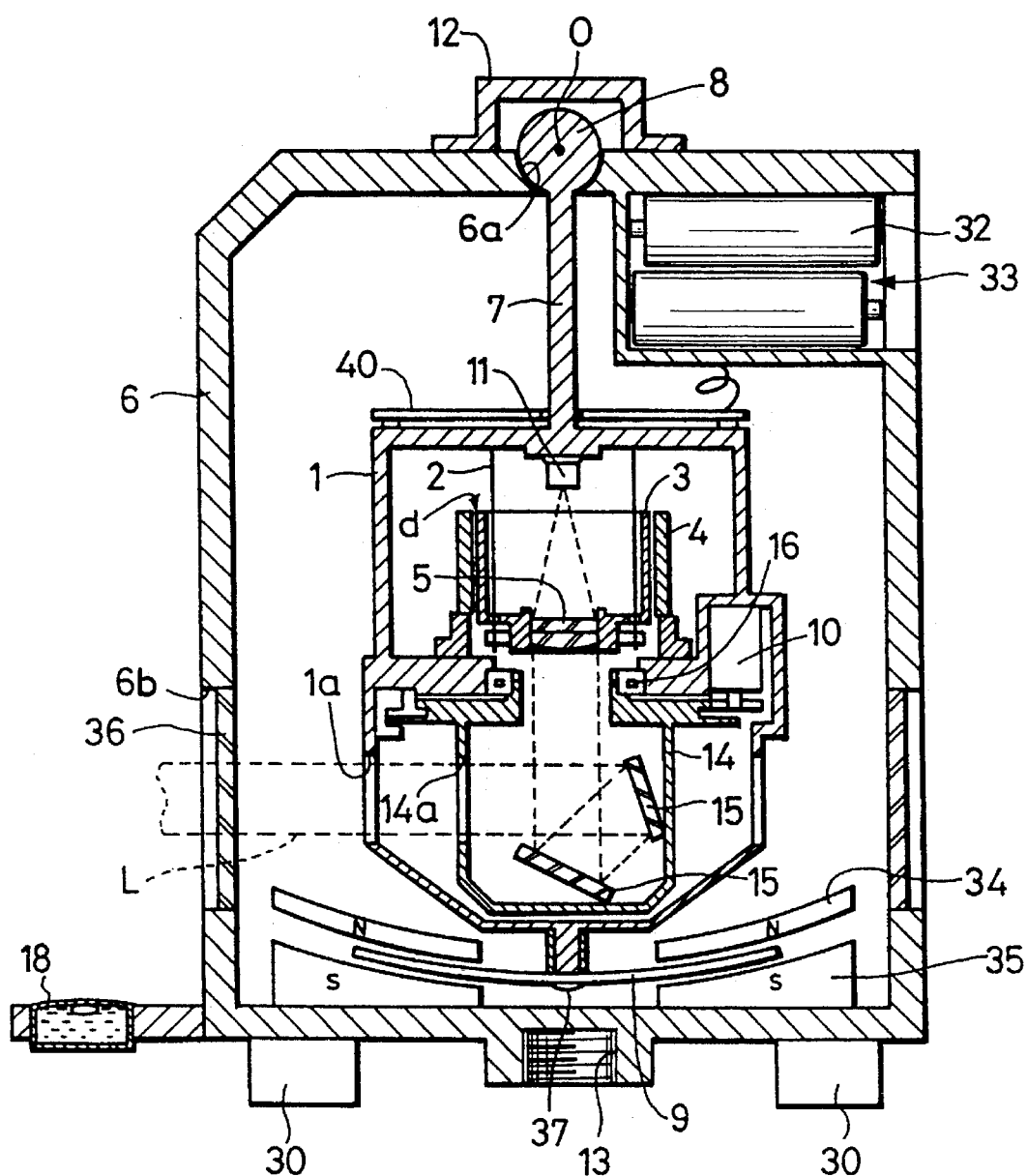
FIG. 2 is a vertical cross-sectional view of a laser beam transmitting apparatus according to a first embodiment of the present invention.
Figure 3:
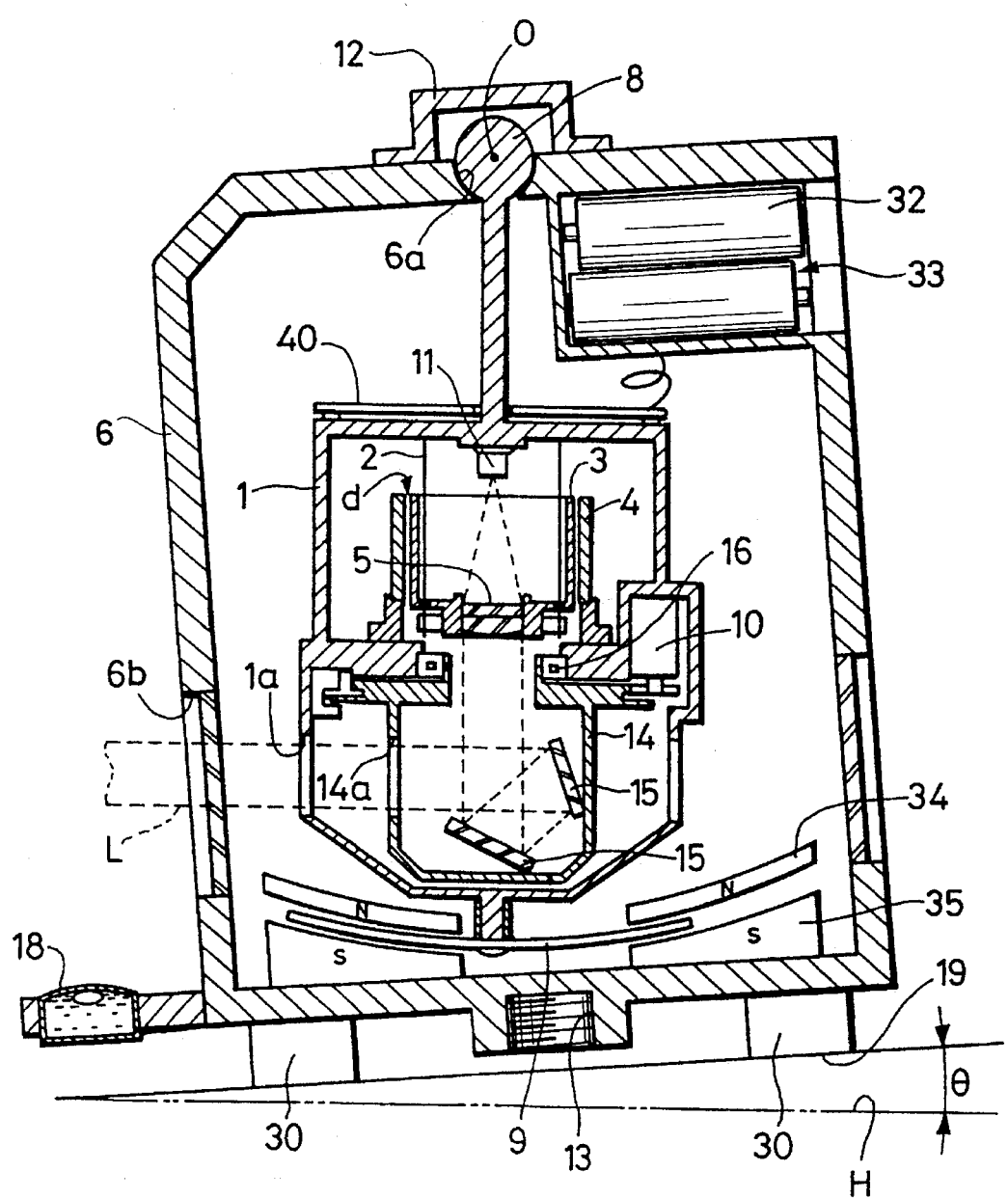
FIG. 3 is a vertical cross-sectional view showing a state in which the apparatus of FIG. 2 is inclined.

A first embodiment of the present invention will hereinafter be described with reference to FIGS. 2 and 3. An outer housing 1 is oscillatably suspended in an outer case 6 through a rough levelling mechanism. An arm 7 is integrally provided on the upper end portion of the outer housing 1, and a sphere portion 8 is integrally provided on the tip end portion of the arm 7. A spherical non-magnetic metal plate 9 (e.g. a copper plate) is fixed to the lower end portion of the outer housing 1 by means of a screw 37.

The upper surface portion of the outer case 6 constitutes a base for supporting the outer housing 1 and is formed with a spherical bearing 6a for rotatably supporting the sphere portion 8. Also, the upper surface portion of the outer case 6 has mounted thereon a lid 12 covering the sphere portion 8. The lower portion of the outer case 6 is formed with a window 6b for transmitting a laser beam outwardly therethrough, and protective glass 36 is mounted in the window 6b. An internally threaded portion 13 for mounting the outer case 6 on a tripod, not shown, and three contact portions 30 bearing against the reference surface of the tripod are integrally provided on the lower surface portion of the outer case 6.

A battery box 33 containing therein a battery 32 for supplying electric power to a laser diode 11 and a circuit base plate 40 fixed to the outer housing 1 is provided in the upper portion of the outer case 6. Spherical magnets 34 and 35 are disposed in the lower portion of the outer case 6. The magnet 34 is located above the non-magnetic metal plate 9, and the magnet 35 differing in polarity from the magnet 34 is located below the non-magnetic metal plate 9. The centers of curvature of the spherical non-magnetic plate 9 and the spherical magnets 34, 35 are coincident with the center of oscillatory movement of the outer housing 1 (the center 0 of the sphere portion 8). The non-magnetic metal plate 9 and the magnets 34, 35 together constitute a vibration attenuating mechanism of the magnetic type.

A cylindrical inner housing 3 holding a collimator lens 5 is suspended in the outer housing 1 by means of three wires 2 to thereby constitute a precise levelling mechanism similar to that disclosed in U.S. Pat. No. 4,221,483. The inner housing 3 is contained in a cylindrical fixed housing 4 fixed to the outer housing 1 and the outer peripheral surface of the inner housing 3 is spaced apart by a minute distance d from the inner peripheral surface of the fixed housing 4. The fixed housing 4 and the inner housing 3 contained in the fixed housing 4 together constitute a vibration attenuating mechanism of the air damper type.

The laser diode 11 emitting a beam of light L is disposed substantially at the focal position of the collimator lens 5. A cylindrical rotatable member 14 is disposed below the collimator lens 5 and the rotatable member 14 is rotatably mounted in the outer housing 1 through a bearing 16. A pair of mirrors 15 for reflecting the beam of light L from the collimator lens 5 at a light angle are fixed to the interior of the rotatable member 14. The rotatable member 14 is rotatable by a motor 10 through a transmission belt, not shown.

The operation of the laser beam transmitting apparatus of this embodiment will now be described. An operator first installs the laser beam transmitting apparatus at a predetermined location through the tripod, and sets it roughly (within ±10°) while watching a bubble tube 18. When as shown in FIG. 3, the mounting surface 19 of the laser beam transmitting apparatus is inclined by θ=10° with respect to a horizontal plane H, the outer housing 1 oscillatably moves about the center 0 of the sphere portion 8 in the direction of gravity. By the action of this rough levelling mechanism, the angle of inclination of about 10° is automatically corrected within 8'. The vibration of the outer housing 1 is attenuated by an eddy current generated when the non-magnetic metal plate 9 crosses the magnetic field formed between the magnets 34 and 35.

As a result of the correction by the rough levelling mechanism, the outer housing 1 leaves an inclination within 8' with respect to the direction of gravity, but this inclination is further corrected by the precise levelling mechanism. That is, the three wires suspending the inner housing 3 always try to maintain verticality and therefore, they are parallel-moved in a substantially horizontal direction by the outer housing 1 being inclined. Thus, the collimator lens 5 is always vibrated back to just beneath the laser diode 11 in a vertical direction, and irrespective of the inclination of the outer housing 1, the laser beam L is always directed vertically downwardly. As a result of this precise levelling, correction accuracy within ±10" is obtained.

The slight spacing d between the outer peripheral surface of the inner housing 3 and the inner peripheral surface of the fixed housing 4 is varied by the relative vibration between the outer housing 1 and the inner housing 3. The relative vibration is attenuated by the flow resistance of air produced at that time.

The beam of light L from the laser diode 11 is collimated by the collimator lens 5 and is reflected in a horizontal direction by the pair of mirrors 15. By the rotation of the rotatable member 14 holding the mirrors 15, the beam of light L is caused to emerge outwardly through the windows 4a, 1a and 6b, and is swept in the direction of 360° in a horizontal plane.

Figure 4:
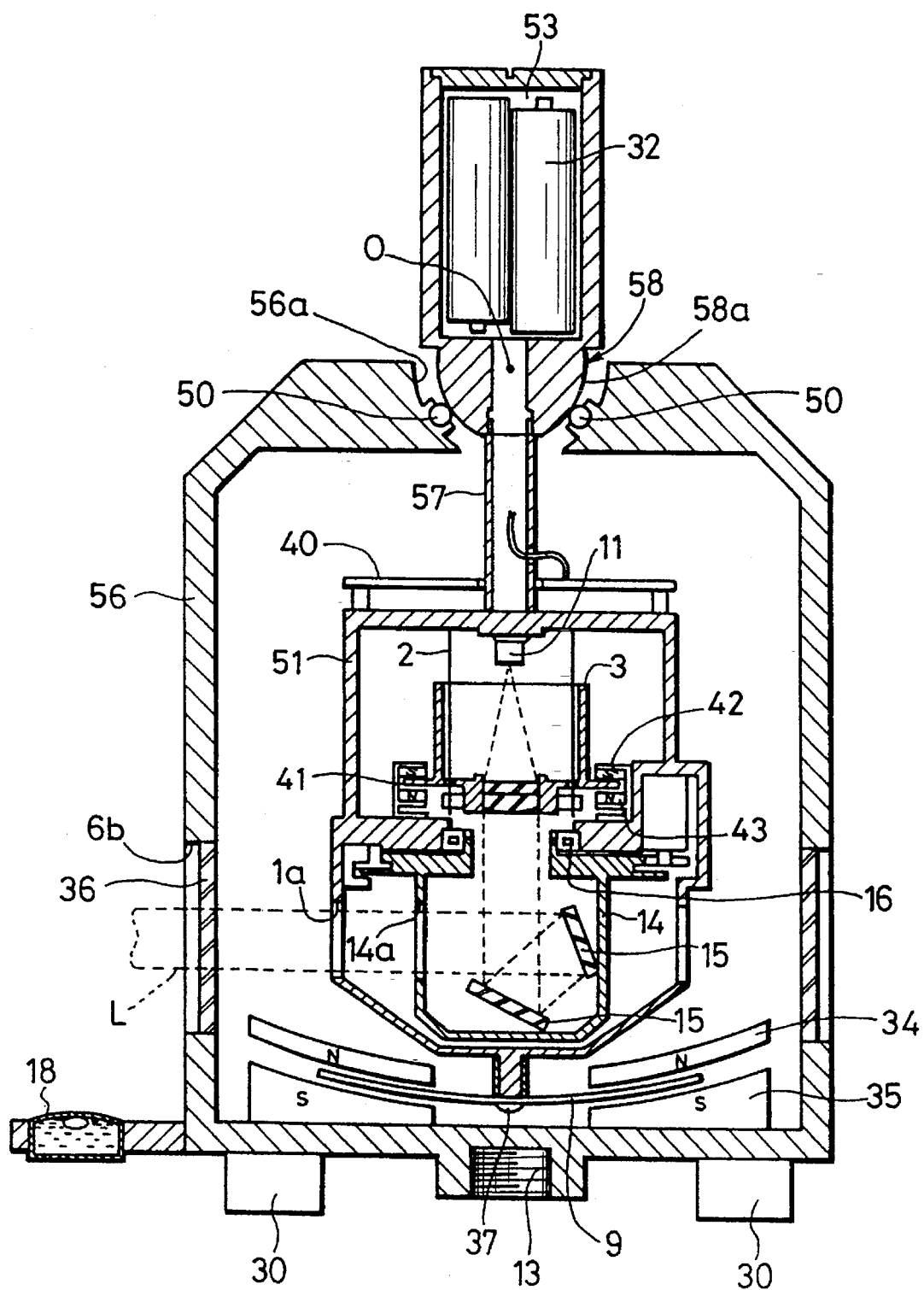
FIG. 4 is a vertical cross-sectional view of a laser beam transmitting apparatus according to a second embodiment of the present invention.
Figure 5:
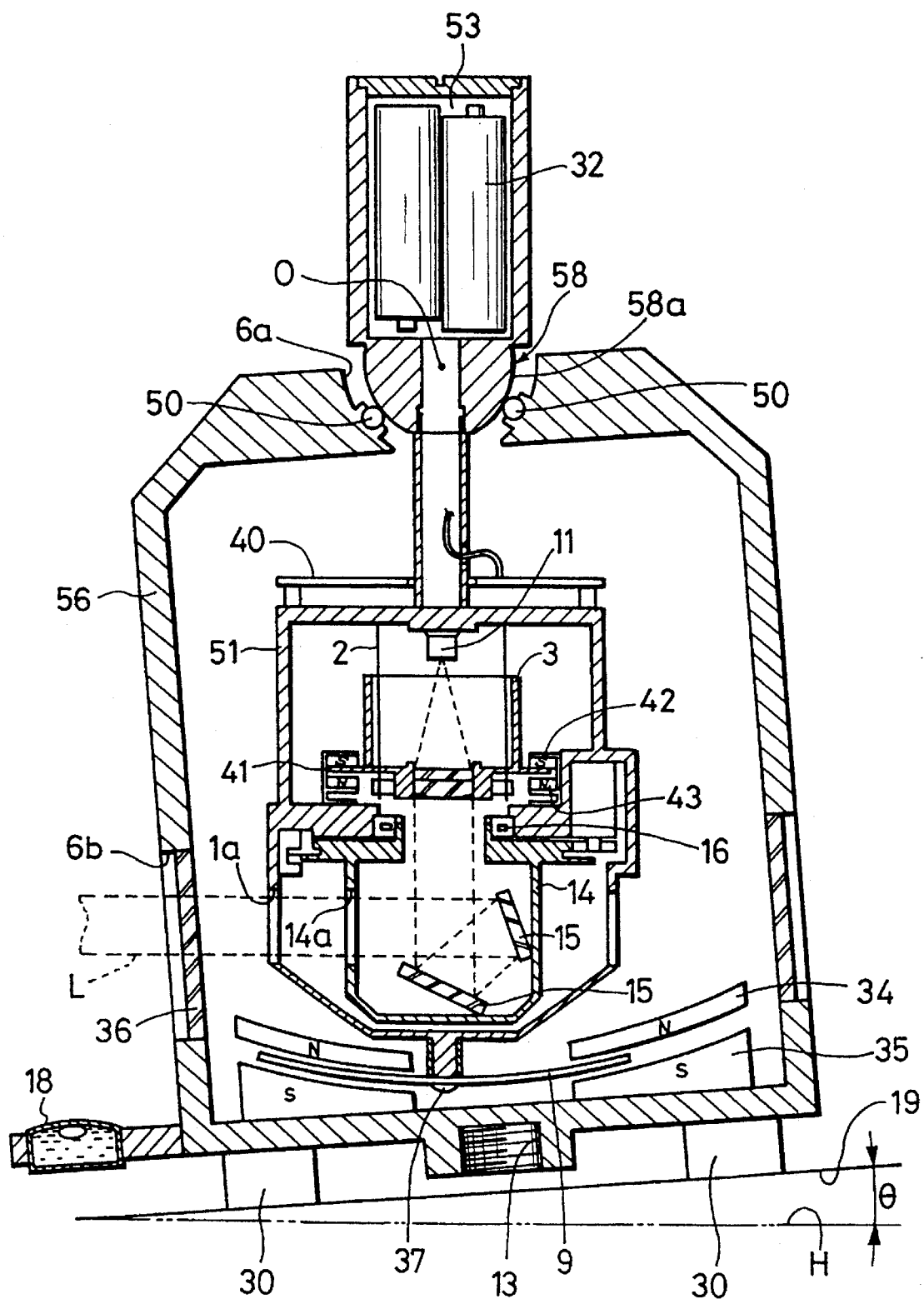
FIG. 5 is a vertical cross-sectional view showing a state in which the apparatus of FIG. 4 is inclined.

A second embodiment of the present invention will now be described with reference to FIGS. 4 and 5. In this embodiment, portions common to those in the aforedescribed first embodiment are given the same reference numerals and need not be described.

In the rough levelling mechanism, in the second embodiment, a hollow arm 57 is integrally provided on the upper end portion of an outer housing 51, a semispherical body 58 is threadably coupled to the tip end portion of the arm 57, and a battery box 53 is integrally provided on the semispherical body 58. Also, a spherical bearing 56a is formed on the upper portion of an outer case 56. The spherical surface 58a of the semispherical body 58 is supported through at least three balls 50 rollably provided in the inner wall of the spherical bearing 56a.

Also, in the vibration attenuating mechanism, in the second embodiment, provision is made of a vibration attenuating mechanism of the magnetic type having an annular non-magnetic metal plate 41 fixed to the lower portion of the inner housing 3, and magnets 42 and 43 disposed above and below it and differing in polarity from each other.

Again by this second embodiment, automatic rough levelling up to correction accuracy 8' and automatic precise levelling within ±10" can be obtained.

In the above-described first and second embodiments, the relation between the collimator lens and the laser diode may be reversed and the light source may be suspended by means of wires. Alternatively, it is also possible to construct the optical element provided between the light source and the collimator lens so as to be suspended. Also, the beam of light emitted from the laser beam transmitting apparatus be not necessarily swept in a horizontal plane. That is, the present invention is also applicable to a laser beam transmitting apparatus simply emitting a beam of light in a predetermined direction.

Figure 6:
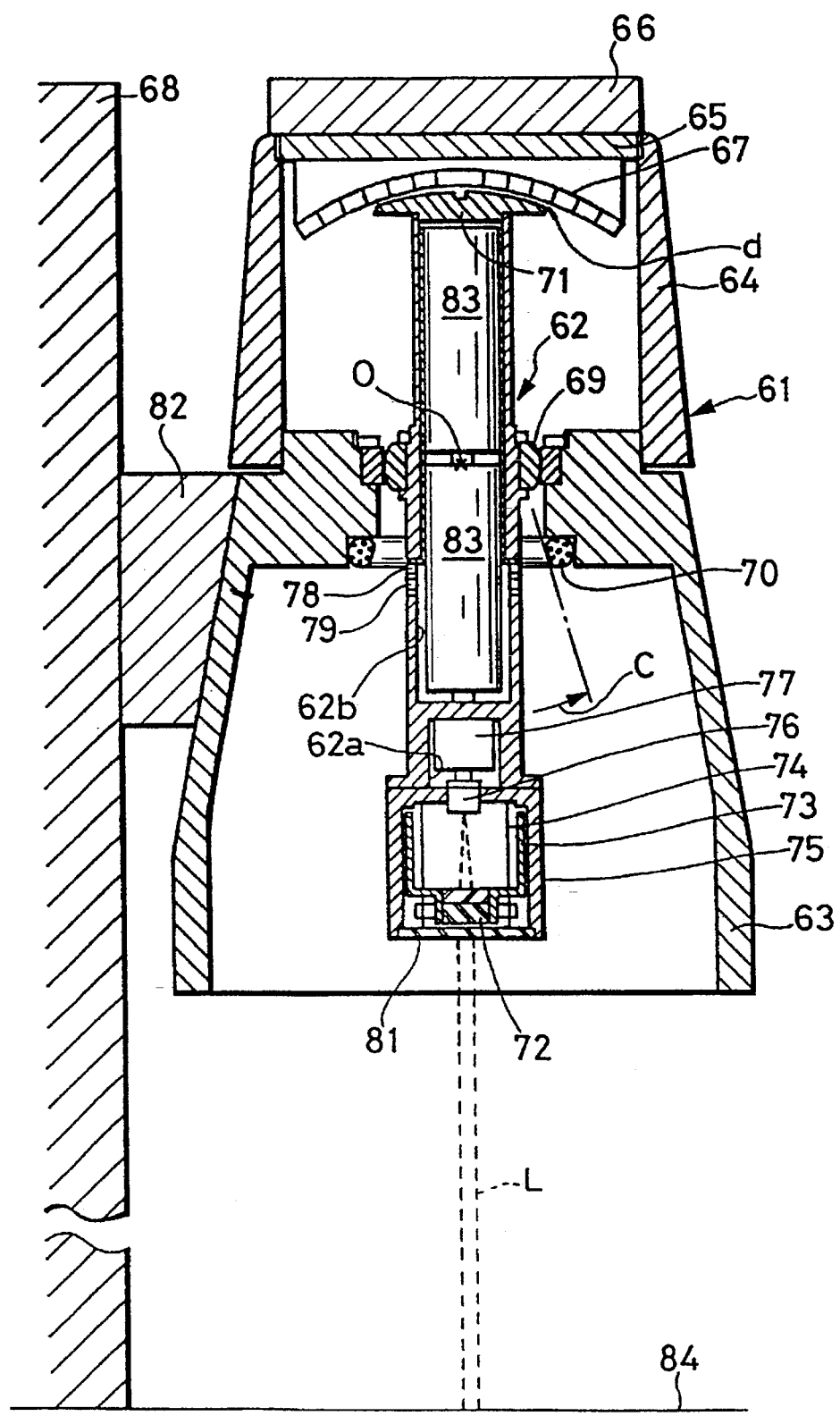
FIG. 6 is a vertical cross-sectional view of a laser beam transmitting apparatus according to a third embodiment of the present invention.

So, a third embodiment in which the present invention is applied to such a laser beam transmitting apparatus will now be described with reference to FIG. 6. FIG. 6 shows an embodiment of a laser beam transmitting apparatus emitting a beam of light in a vertical direction, and this embodiment is provided with an outer case 61 and a hollow housing 62 suspended in the outer case 61.

Figure 7:
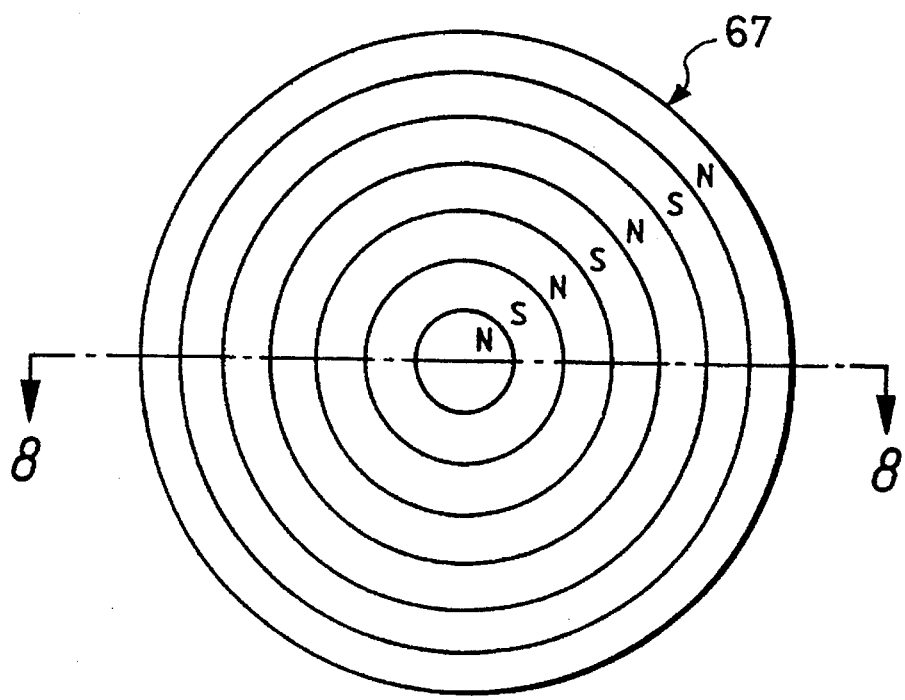
FIG. 7 is a plan view showing the structure of a magnet.
Figure 8:
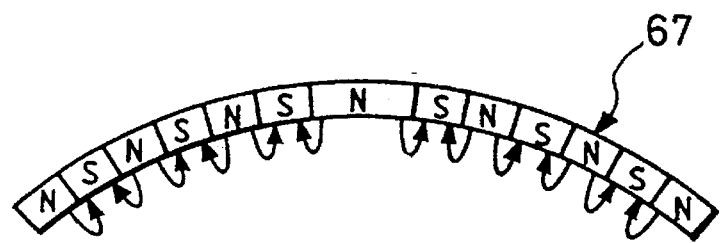
FIG. 8 is a cross-sectional view taken along the line 8—8 of FIG. 7.

The outer case 61 has a barrel-shaped base 63, a barrel-shaped upper case 64 placed on the base 63, and a cap 65 threadably engaged with the upper end of the upper case 64. A magnet 66 for fixing the apparatus to the ceiling is provided on the upper surface of the cap 65, and a spherical-surfaced magnet 67 is provided on the lower surface of the cap 65. As shown in FIGS. 7 and 8, the magnet 67 has magnetic poles of different polarities alternately magnetized in the radial direction thereof. A magnet 82 for fixing the outer case 61 to an iron post 68 is provided on the outer peripheral surface of the base 63. A sliding bearing 69 for oscillatably supporting the housing 62 is provided on the inner peripheral surface of the upper portion of the base 63 to constitute a rough levelling mechanism. This bearing 69 may be replaced by gimbal structure. An electrically conductive resilient ring 70 is provided below the sliding bearing 69.

A lid 71 formed of a non-magnetic metal is mounted on the upper end of the housing 62, and the upper surface of the lid 71 is formed into a spherical surface. The centers of curvature of the spherical surface of the lid 71 and the spherical surface of the magnet 67 coincide with the center of oscillatory movement 0 of the housing 62, and they always keep a constant spacing d. A cylindrical inner housing 73 holding a collimator lens 72 is suspended from the lower portion of the housing 62 by means of three wires 74 to constitute a precise levelling mechanism similar to that in the aforedescribed embodiment. The inner housing 73 is contained in a cylindrical fixed housing 75 fixed to the lower portion of the housing 62, and an air damper is formed between the two housings. A laser diode 76 emitting a beam of visible light L is disposed substantially at the focal position of the collimator lens 72.

The interior of the housing 62 is divided into two containing chambers 62a and 62b, and a control circuit 77 for driving the light source is disposed in the containing chamber 62a, and a battery 83 is contained in the containing chamber 62b. A pair of annular electrical contacts 78 and 79 insulated from each other are disposed on the outer peripheral surface of the housing 62. The resilient ring 70 and the electrical contacts 78, 79 contact with each other when the housing 62 is inclined by a predetermined angle C or greater from a reference position, whereby electrical conduction takes place between the electrical contacts 78 and 79. The control circuit 77 detects this conduction and turns on and off or turns off the laser diode 76, thereby informing that the laser beam transmitting apparatus is installed in an unsuitable posture.

The apparatus of this third embodiment is used to install, for example, the iron post 68 exactly vertically. That is, the apparatus can be fixed to the iron post 68 stood on a floor surface 84 and the beam of light can be transmitted toward the floor surface, and the inclination of the iron post can be adjusted so that the distance from the lower end of the iron post 68 to the position of the light spot on the floor surface may coincide with a reference distance.

What is claimed is:

1. A laser beam transmitting apparatus comprising:

a beam transmitter for supplying a beam of light;

a housing for holding said beam transmitter;

a precise levelling mechanism provided between said beam transmitter and said housing;

a base for supporting said housing; and a rough levelling mechanism provided between said housing and said base.

2. A laser beam transmitting apparatus according to claim 1, wherein said rough levelling mechanism includes a concave spherical inner wall surface provided on said base for receiving said housing.

3. A laser beam transmitting apparatus according to claim 2, wherein said rough levelling mechanism further includes a bearing device disposed between said housing and said spherical inner wall surface.

4. A laser beam transmitting apparatus according to claim 2, wherein said spherical inner wall surface has a center of curvature, and said housing has a centroid below the center of curvature of said spherical inner wall surface.

5. A laser beam transmitting apparatus according to claim 1, further comprising a vibration attenuator provided between said housing and said base.

6. A laser beam transmitting apparatus according to claim 5, wherein said vibration attenuator includes a vibration attenuator of the magnetic type comprising a combination of a non-magnetic metal plate and a magnet disposed with a predetermined gap therebetween.

7. A laser beam transmitting apparatus according to claim 6, wherein said magnet has a magnetic pattern having different magnetic poles alternately magnetized.

8. A laser beam transmitting apparatus comprising:

a beam transmitter for supplying a beam of light;

a housing for holding said beam transmitter, said housing having a coupled portion above it;

a precise levelling mechanism provided between said beam transmitter and said housing;

a base for supporting said housing, said base having a concave spherical inner wall surface for receiving said coupled portion, the center of curvature of said spherical inner wall surface lying above the centroid of said housing; and a bearing device disposed between said coupled portion and said spherical inner wall surface.

9. A laser beam transmitting apparatus according to claim 8, further comprising:

an outer case for containing said housing, said outer case having a bottom surface portion and an upper surface portion forming said base; and a vibration attenuator provided between said housing and the bottom surface portion of said outer case.

10. A laser beam transmitting apparatus according to claim 9, wherein said vibration attenuator includes:

a non-magnetic metal plate provided on said housing and having a spherical surface; and a magnet provided at a location on the bottom surface portion of said outer case, which is opposed to said metal plate and has a spherical surface;

the spherical surfaces of said metal plate and said magnet have centers of curvature coincident with the center of curvature of the spherical inner wall surface of said base.

11. A laser beam transmitting apparatus comprising:

an outer case having an upper surface portion;

a beam transmitter for supplying a beam of light;

an outer housing oscillatably suspended from the upper surface portion of said outer case; and an inner housing holding said beam transmitter and oscillatably suspended from said outer housing.

12. A laser beam transmitting apparatus comprising:

a base;

a beam transmitter for supplying a beam of light;

a housing for said beam transmitter, said housing having a center of oscillatory movement above the centroid thereof and being oscillatably supported on said base;

a levelling mechanism provided between said housing and said base; and a battery for supplying electric power to said beam transmitter, said battery being contained in said housing.

13. A laser beam transmitting apparatus comprising:

a base;

a beam transmitter for supplying a beam of light;

a housing for holding said beam transmitter, said housing having center of oscillatory movement above the centroid thereof and being oscillatably supported on said base; and a levelling mechanism provided between said housing and said base, wherein said levelling mechanism includes a concave spherical inner wall surface provided on said base for receiving said housing, and a bearing device disposed between said housing and said spherical inner wall surface.

* * * * *